April 6, 1954    D. E. SCHOTT    2,674,135
DIFFERENTIAL
Filed May 22, 1952    2 Sheets-Sheet 1
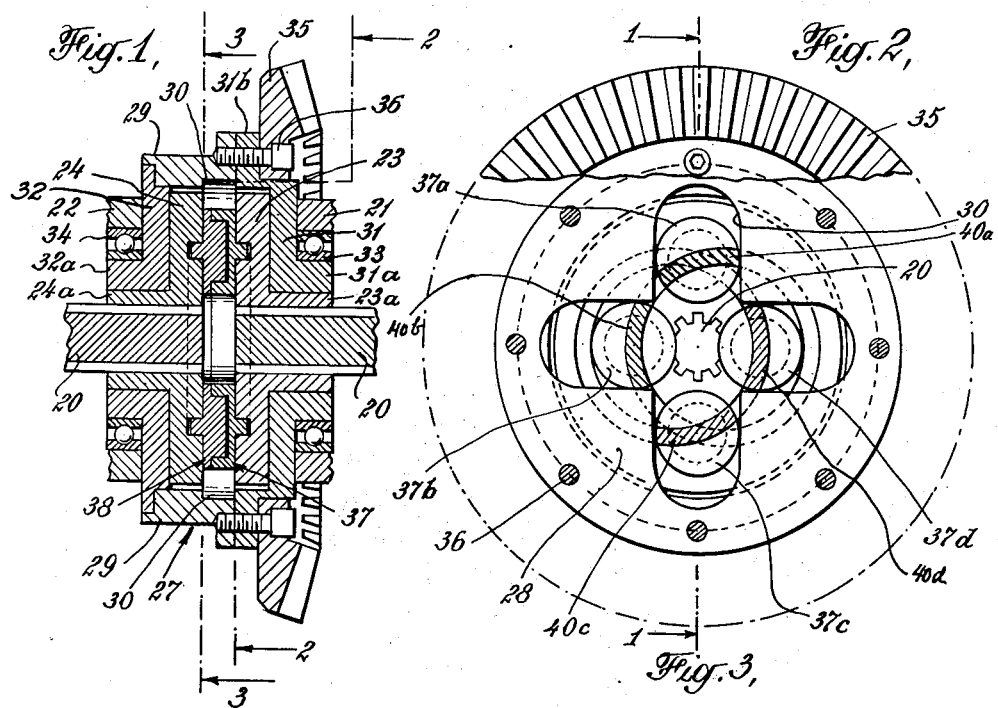
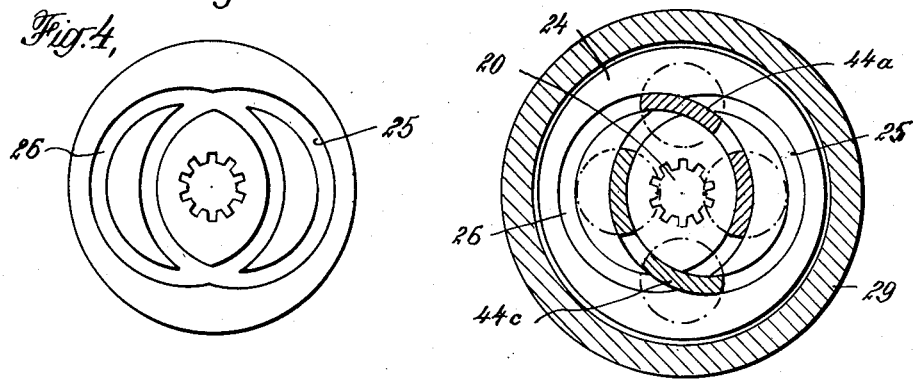
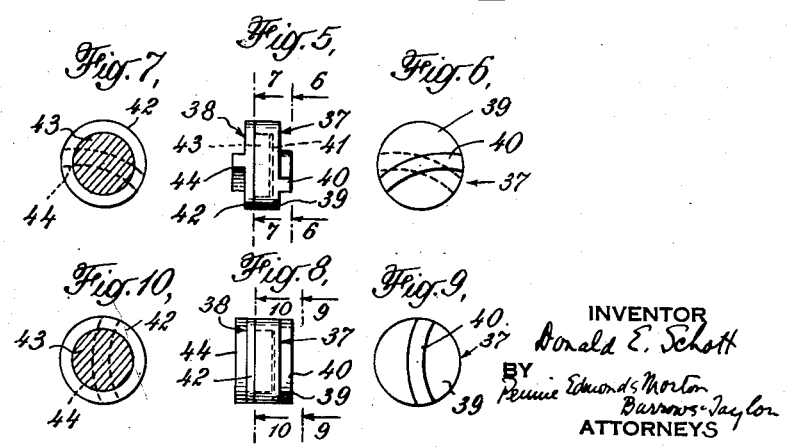
INVENTOR
Donald E. Schott
BY
Pennie Edmonds Morton
Burrows Taylor
ATTORNEYS April 6, 1954     D. E. SCHOTT     2,674,135
DIFFERENTIAL
Filed May 22, 1952     2 Sheets-Sheet 2
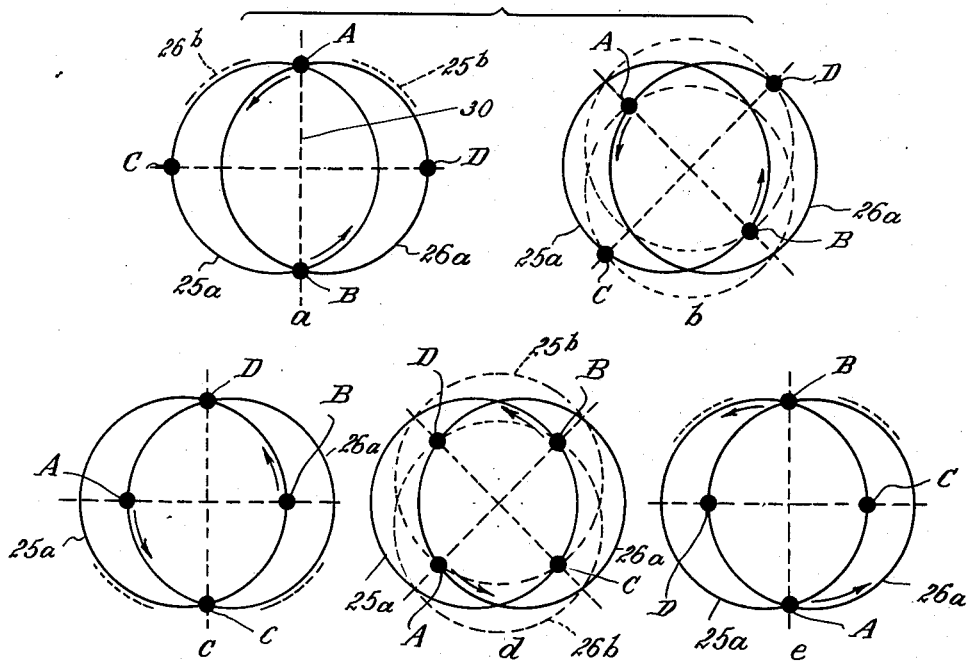
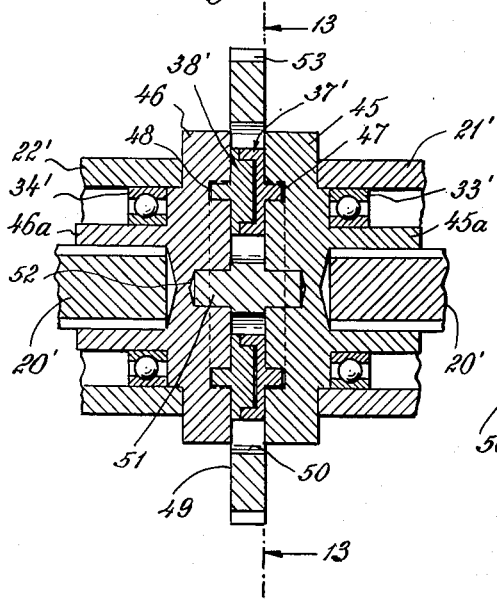
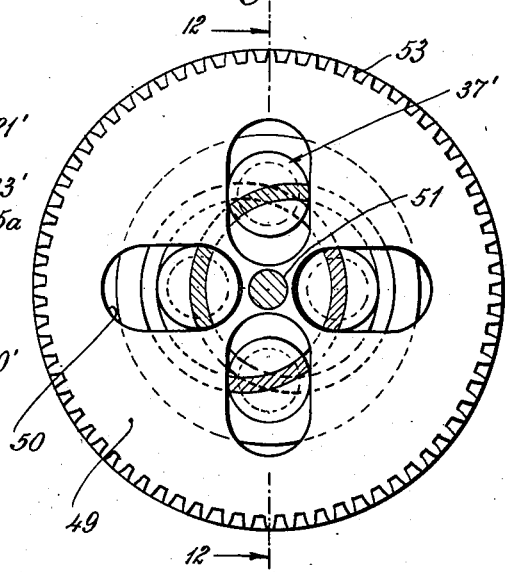
INVENTOR
Donald E. Schott
BY
Pennie Edmonds Morton Barrows & Taylor
ATTORNEYS Patented Apr. 6, 1954

2,674,135

UNITED STATES PATENT OFFICE 2,674,135

DIFFERENTIAL

Donald E. Schott, Flushing, N. Y.

Application May 22, 1952, Serial No. 289,237

9 Claims. (Cl. 74—650)

This invention relates to torque distributors, commonly referred to as differentials, and is concerned more particularly with a novel differential, which affords numerous advantages over similar devices as heretofore constructed.

The new differential is simple in construction and it is inexpensive to manufacture, because it does not include any gears and can be made without the use of special machinery. It provides a useful torque output on either driven member, independent of the load on the other, and operates in that manner in both directions of rotation. Also, it provides a free differentiating action, when the direction of power transmission through it is reversed as, for example, in an automobile, which is coasting with the wheels driving the engine. The differential provides a positive drive at all times without excessive backlash and does not operate as a friction device. All operating stresses occur as radial, tensile, or compressive stresses within the driven members, and such stresses are not transmitted to or carried by bearings, and no thrust loads are produced. In its preferred form, the differential is symmetrical in construction and operation, so that it is dynamically balanced at all positions and speeds.

The new differential is similar to that shown in my copending application Ser. No. 259,433 filed December 1, 1951, now Patent 2,624,213, but differs from the differential of that application in that the connections between the driving and driven elements have been simplified.

While the new differential may be used for numerous purposes, it affords special advantages, when employed in automotive vehicles. An embodiment of the differential suitable for such use will, accordingly, be illustrated and described in detail for purposes of explanation.

The automotive form of the new differential comprises a pair of like driven members connected to aligned axle shafts and lying on either side of a driving member. The driving members may have the form of discs provided with hubs for connection to the axle shafts, and the driving member is also preferably of disc form. The opposed faces of the driven members are provided with a plurality of intersecting circular grooves, which are all of the same radius, and the centers of curvature of all the grooves in the discs are equally spaced from and equiangularly spaced about the axes of the driven members.

The driving member has angularly spaced radial slots, and a pair of connectors lies within each slot. Each connector of a pair has a projection entering a groove in the adjacent driven member and the connectors of a pair are pivotally engaged, so that they can move angularly relative to one another. The arrangement of the connectors relative to the driven members is such that the ribs of a pair of connectors, which lie in alignment with aligned intersections of grooves in the two driven members, enter non-registering grooves in those members and transmit power from the driving member to the driven members, as will be explained. The driving member is driven from a prime mover in any convenient manner, as by means of a ring gear attached to its periphery.

For a better understanding of the invention, reference may be made to the accompanying drawings in which Fig. 1 is a longitudinal section through one form of the new differential on the line 1—1 of Fig. 2;

Figs. 2 and 3 are transverse sectional views on the lines 2—2 and 3—3, respectively, of Fig. 1;

Fig. 4 is a view in elevation showing the grooves in one of the driven members;

Fig. 5 is a view in side elevation of a pair of assembled connectors employed in the differential;

Fig. 6 is a view in end elevation on line 6—6 of Fig. 5;

Fig. 7 is a sectional view on the line 7—7 of Fig. 5;

Fig. 8 is a view similar to Fig. 5 but with the assembled connectors turned through 90°;

Fig. 9 is a view in end elevation on the line 9—9 of Fig. 8;

Fig. 10 is a sectional view on the line 10—10 of Fig. 8;

Fig. 11 is a series of diagrams showing the operation of the differential;

Fig. 12 is a view in longitudinal section of a modified form of the differential on the line 12—12 of Fig. 13; and Fig. 13 is a sectional view on the line 13—13 of Fig. 12.

The new differential in the form illustrated in Fig. 1 is suitable for use in an automobile having aligned axle shafts 20 within an axle housing shown as made of two parts 21, 22 and it includes a pair of driven members 23, 24 of identical construction. The two members have the form of discs having hubs 23a, 24a splined to respective shafts 20 and a plurality of intersecting circular grooves formed in the face of each disc. The grooves in the discs are all of the same radius and the centers of curvature of the grooves are equally spaced from and equiangularly spaced about the common axis of the discs. The discs illustrated are provided with two grooves and the centers of curvature of the grooves in a disc are, accordingly, 180° apart and thus lie on a diameter of the disc at equal distances on opposite sides of the axis thereof. The grooves in the two discs are designated 25, 26 and, when the driven members in the assembled differential lie with the centers of curvature of their grooves on a line, and the assembly is viewed from one end, the grooves 25 and 26 of one disc are in registry with the grooves 26 and 25, respectively, of the other disc.

The driven members are rotated by a driving member 27, which is coaxial with the driven members and has the form of a plate 28 having a cylindrical rim 29. The plate lies between the opposed faces of the discs of the driven members and it is provided with a plurality of angularly spaced radial slots 30. The plate may have the same number of slots as the number of grooves in a disc or twice as many slots as grooves, the latter arrangement being preferred and illustrated. In the construction shown, the four slots 30 of the driving member are spaced 90° apart and the slots are inwardly open to each other at the axis of the driving member and terminate outwardly short of the rim 29 thereon.

A supporting member 31 of disc form having a hub 31a is mounted with its hub encircling the hub 23a of driven member 23, and a generally similar supporting member 32 having a hub 32a is mounted with its hub encircling hub 24a of driven member 24. Anti-friction bearings 33 and 34 lie between hubs 31a, 32a, respectively, and the parts 21, 22 of the axle housing. The member 31 is provided with an offset peripheral flange 31b abutting one end of the rim 29 of the driving member and a bevel ring gear 35 is secured to the flange by screws 36 passing through the web of the gear and the flange and into the adjacent end of the rim 29 on the driving member. The other end of rim 29 is seated in a peripheral channel in the outer edge of member 32.

Power is transmitted from the driving member to the driven members by pairs of connectors 37, 38 mounted in respective slots 30 in the driving member. The connector 37 of each pair has a base 39 of cylindrical form having a diameter slightly smaller than the width of a slot 30 and the base is provided on one side with a projection 40, which is illustrated as taking the form of an arcuate rib adapted to slide in one of the grooves in a driving member. Each connector 38 is formed with a cylindrical base 42 of the same diameter as base 39 of connectors 37. On one face, base 42 is provided with a circular projection 43 adapted to enter a socket 41 in a connector 37. On its other face, base 42 is formed with an arcuate rib 44 similar to rib 40.

In assembling the parts of the differential, a pair of connectors 37, 38 is mounted in each slot 30 in the driving member and the ribs on each pair of connectors enter grooves in the respective driven members. The connectors are so disposed that, of the four connectors having ribs entering grooves in the same driven member, the ribs 40a, 40b of two adjacent connectors 37a, 37b enter the same groove in the driven member and the ribs 40c, 40d of the other two connectors 37c, 37d enter the other groove in that member. Also, the connectors of each pair, which lie in line with aligned intersections of the grooves in the two driven members, have ribs entering non-registering grooves in the respective members. This arrangement will be apparent from Figs. 2 and 3, where it will be seen that connector 37a and its associated connector lie in line with the upper aligned intersections of the grooves in the two driven members and the rib 40a of connector 37a lies in a groove in driven member 23, while the associated connector has a rib 44a lying in the non-registering groove in driven member 24. The pair of connectors, which includes connector 37c, lies in line with the aligned lower intersections of the grooves in the two members and rib 40c of connector 37c enters one of the grooves in driven member 23, while the associated connector has a rib 44c entering the non-registering groove in driven member 24.

The driving member of the differential may be rotated by power applied thereto in any convenient manner, as, for example, the driving member may have a rim formed as a pulley and driven by a belt, or the rim may have sprocket teeth and be driven by a chain. In a differential for automotive use, power is transmitted from the propeller shaft of the vehicle to the differential through gearing including the driving gear 35.

In the operation of the differential, gear 35, driving member 27, and the two supporting members 31, 32 rotate as a unit about the common axis of shafts 20. In such rotation of the driving member, it carries the pairs of connectors with it and each pair of connectors, such as the pair including connector 37a, which lie in line with aligned intersections of grooves in the driven members at any instant, apply power to the driven members and tend to rotate them. If both driven members are unrestrained, the members rotate with the pairs of connectors and the connectors remain substantially stationary within grooves 30. If one driving member is restrained, a differentiating action takes place, which is made clear in Fig. 11.

In the five diagrams in Fig. 11, the circular grooves in the two driven members are illustrated as they would appear if viewed from the outer end of driven member 24. The grooves in member 24 are represented by solid lines 25a, 26a and the grooves in member 23 are indicated by dotted lines 25b, 26b. The radial slots in the driving member are represented by broken lines 30 and the pairs of connectors are represented by solid circles with two pairs of connectors lying 180° apart marked A, B and the other two pairs of connectors marked C, D.

In Fig. 11a, the two driven members are shown with the centers of curvature of their grooves lying on a horizontal line, so that groove 25a in member 24 is in registry with groove 26b in member 23, and groove 26a in member 24 is in registry with groove 25b in member 23. When the driven members are in the positions shown, two slots 30 in the driving member extend vertically and two horizontally. The pairs of connectors A and B lie within the vertical slots in line with aligned upper and lower intersections of the grooves in the two driven members. One of the connectors of pair A has a rib entering groove 26a in member 24 and the other connector of pair A has a rib entering groove 26b in member 23, the two grooves being out of registry. Similarly, the pair of connectors B have ribs entering non-registering grooves in the driven members. The ribs of pairs of connectors C, D lie in registering grooves in the two driven members.

Fig. 11b shows what occurs when the driving member is rotated through an angle of 45° counter-clockwise, while the driven member 24 is restrained and remains at rest. In such rotational movement, the pair of connectors A move through an angle of 45° with their slot in the driving member. At the same time, the connector of this pair having a rib entering groove 26a in restrained driven member 24, moves along groove 26a, and the pair of connectors are caused to move inwardly along their slot 30. During such movement of the slide, the connector having a rib entering groove 26b of member 23 has moved along that groove and caused member 23 to move counter-clockwise through an angle of 90°. The pair of connectors B are moved in the same manner as connectors A and assist in the rotation of member 23. In the new position of member 23, the centers of curvature of its grooves lie on a vertical line.

When the driving member has moved counter-clockwise through an angle of 90° from its original position, the parts assume the positions shown in Fig. 11c. In this condition of the driven members, their centers of curvature lie on a horizontal line, and, while the driving member has passed through 90°, driven member 23 has been moved angularly through 180°. At the same time, pairs of connectors A and B have moved inwardly in their slots to their inmost positions, and the other two pairs of connectors C, D have moved into line with aligned upper and lower intersections of the grooves in the two driven members.

When the driving member moves through another 45°, as shown in Fig. 11d, the driven member 23 is moved through another 90°, and, when the driving member has travelled through 180°, as shown in Fig. 11e, the driven member 23 has been rotated through one complete turn. The two driven members now lie with their grooves in same relative positions as in Fig. 11a, but the pairs of connectors A, B now lie in line, respectively, with the lower and upper intersections of the grooves in the two members. During further rotation of the driven member, the operations above described proceed until the parts assume the positions shown in Fig. 11a with pairs of connectors A and B again in line, respectively, with the aligned upper and lower intersections of the grooves in the two driven members. Accordingly, when driven member 24 is wholly restrained, and the driving member rotates through 360°, driven member 23 is rotated through two complete turns or 720°.

When the parts of the differential are in the position shown in Figs. 11a, 11c, and 11e, two pairs of connectors lie in line with aligned intersections in the grooves in the two driven members. And, at this instant, power is being transmitted from the driving member to the driven members through these two pairs of connectors only and the other two pairs of connectors are idle. When the parts are in the positions shown in Figs. 11b and 11d, all four pairs of the connectors lie in line with aligned intersections of the grooves in the driven members and, at this instant, all four pairs of connectors are transmitting power.

The form of the differential shown in Figs. 12 and 13 comprises a pair of like driven members 45, 46 having the form of discs provided with hubs 45a, 46a splined to respective aligned axle shafts 20', 20' within an axle housing made up of two parts 21', 22'. The opposed faces of the discs are provided with a plurality of intersecting grooves 47, 48 and the grooves in the discs are all of the same radius. Also the centers of curvature of all the grooves are equally spaced from and equiangularly spaced about the common axis of the discs. An anti-friction bearing 33' lies between hub 45a and axle housing 21' and a similar anti-friction bearing 34' lies between hub 46a and axle housing 22'. A driving member 49 lies between the driven members and it has the form of a disc provided with a plurality of radial slots 50. An axial stud 51 projects from each face of the driving member and it is received in a central socket 52 in the adjacent driven member. The driving member is illustrated as provided along its rim with gear teeth 53, although, if preferred, a separate gear may be secured to the portion of the driving member projecting beyond the driven member. A pair of connectors 37', 38', which are similar to connectors 37, 38, are mounted in each radial slot 50 in the driving member and the engagement of the ribs on the connectors in the grooves in the driven members is the same as that above described in connection with the form of the differential shown in Fig. 1.

The differential shown in Figs. 12, 13 differs from that shown in Fig. 1 in the respect that no supporting members corresponding to members 31, 32 are required, and the driving member 49 may be a disc without a cylindrical rim. The differential of Figs. 12, 13 functions in the same manner as that shown in Fig. 1 and provides the same differentiating action as explained by reference to Fig. 11.

The new differential is similar to that shown in my copending application, above identified, except that the connections between the driving member and the driven members are made by pairs of connectors having interengaging parts, and no slides operating in the slots in the driving member and engaging separate connectors are required.

It will be apparent from the foregoing that, if the driven members have two grooves and the driving member has two slots, the slots must be at right angles to each other in order that the differential will function. If the slots were on the same diameter, a condition would arise, in which the pairs of connectors in the slots would occupy the same positions relative to the driven members as the pairs of connectors C, D in Fig. 11a, and the connectors would transmit no power. If the driving member has only a pair of slots lying at right angles to each other, a condition will occur when a pair of connectors in one slot is transmitting power and the pair of connectors in the other slot is not transmitting power. Since, at this instant, power will be transmitted through a single pair of connectors only, the action of the differential is unbalanced.

Each driven member may have three intersecting circular grooves and, in that event, the driving member must have as a minimum three slots. When the driven members have more than two grooves, the connectors may be of somewhat lighter construction than is necessary in a two-groove differential for carrying the same load. If desired, the driven members may have more than three grooves, but any advantage to be gained by using driven members with more than three grooves would probably be overbalanced by the disadvantage of the complexities of the construction and, for most purposes, a differential having driven members provided with two grooves is satisfactory. The manner of constructing the differential with driven members having three or more grooves is described and illustrated in my Patent 2,624,213.

I claim:
1. In a differential, the combination of a pair of driven members mounted for coaxial rotation, each member having a plurality of intersecting circular grooves in its face opposed to the other member, the grooves all having the same radius and the centers of curvature of all the grooves being equally spaced from and equiangularly spaced about the common axis of rotation of the members, a driving member mounted for rotation coaxially with and between the driven members and having a plurality of angularly spaced radial slots extending through it, the number of slots being at least equal to the number of grooves in a driven member, and a plurality of pairs of connectors mounted for sliding movement in the slots in the driving member, one pair in each slot, the connectors of each pair having interengaging coaxial pivotal parts entering the slot for the pair of connectors and each connector of a pair having a part mounted for sliding movement in a groove in the adjacent driven member, each groove receiving at least one of said parts and each pair of connectors lying in line with aligned intersections of grooves in the two driven members having parts mounted for sliding movement in non-registering grooves in the respective members.

2. In a differential, the combination of a pair of driven members mounted for coaxial rotation, each member having a plurality of intersecting circular grooves in its face opposed to the other member, the grooves all having the same radius and the centers of curvature of all the grooves being equally spaced from and equiangularly spaced about the common axis of rotation of the members, a driving member mounted for rotation coaxially with and between the driven members and having a plurality of angularly spaced radial slots extending through it, the number of slots being twice the number of grooves in a driven member, and a plurality of pairs of connectors mounted for sliding movement in the slots in the driving member, one pair in each slot, the connectors of each pair having interengaging coaxial pivotal parts entering the slot for the pair of connectors and each connector of a pair having a part mounted for sliding movement in a groove in the adjacent driven member, each groove receiving at least one of said parts and each pair of connectors lying in line with aligned intersections of grooves in the two driven members having parts mounted for sliding movement in non-registering grooves in the respective members.

3. In a differential, the combination of a pair of driven members, each member including a disc having a plurality of intersecting circular grooves in one face and the members being mounted for coaxial rotation with their grooved faces opposed, the grooves in the discs being all of the same radius and the centers of curvature of the grooves all being equally spaced from and equiangularly spaced about the common axis of rotation of the members, a driving member coaxial with and between the discs and having a plurality of angularly spaced radial slots extending through it, the number of slots being at least equal to the number of grooves in a driven member, and a plurality of pairs of connectors mounted for sliding movement in the slots in the driving member, one pair in each slot, the connectors of each pair having interengaging coaxial pivotal parts entering the slot for the pair of connectors and each connector of a pair having a part mounted for sliding movement in a groove in the adjacent driven member, each groove receiving at least one of said parts and each pair of connectors lying in line with aligned intersections of grooves in the two driven members having parts mounted for sliding movement in non-registering grooves in the respective members.

4. In a differential, the combination of a pair of driven members mounted for coaxial rotation, each member having a flat radial face formed with a pair of intersecting circular grooves, the grooves in the members being all of the same radius and the centers of curvature of the grooves in each member lying on a diameter of the member on opposite sides of the axis of rotation with all said centers lying equally spaced from said axis, the members being disposed with their grooved faces opposed, a driving member coaxial with and between the driven members and having four equiangularly spaced radial slots, and a plurality of pairs of connectors mounted for sliding movement in the slots in the driving member, one pair in each slot, the connectors of each pair having interengaging coaxial pivotal parts entering the slot for the pair of connectors and each connector of a pair having a part mounted for sliding movement in a groove in the adjacent driven member, each groove receiving at least one of said parts and each pair of connectors lying in line with aligned intersections of grooves in the two driven members having parts mounted for sliding movement in non-registering grooves in the respective members.

5. In a differential, the combination of a pair of driven members mounted for coaxial rotation, each member having means for attachment to an element to be rotated therewith, each member having a surface formed with a plurality of intersecting circular grooves lying in a plane normal to the axis of rotation of the member, the members having the same number of grooves and being disposed with the grooves in one member opening toward those in the other, all the grooves in the members being of the same radius and having their centers of curvature equally spaced from and equiangularly spaced about the common axis of rotation of the members, a driving member between the driven members, means for supporting the driving member for coaxial rotation with the driven members, the driving member having a plurality of angularly spaced radial slots extending through it, the number of slots being at least equal to the number of grooves in a driven member, and a plurality of pairs of connectors mounted for sliding movement in the slots in the driving member, one pair in each slot, the connectors of each pair having interengaging coaxial pivotal parts entering the slot for the pair of connectors and each connector of a pair having a part mounted for sliding movement in a groove in the adjacent driven member, each groove receiving at least one of said parts and each pair of connectors lying in line with aligned intersections of grooves in the two driven members having parts mounted for sliding movement in non-registering grooves in the respective members.

6. In a differential, the combination of a pair of driven members mounted for coaxial rotation, each member including a disc and an axial hub, the members being mounted with the faces of their discs opposed to each other and said faces being formed with a plurality of intersecting circular grooves all of the same radius, the centers of curvature of all the grooves lying equally spaced from and equiangularly spaced about the axis of rotation of the driven members, a driving member between the driven members, means for supporting the driving member for coaxial rotation with the driven members, the driving member having a plurality of angularly spaced radial slots, the number of slots being at least equal to the number of grooves in a driven member, and a plurality of pairs of connectors mounted for sliding movement in the slots in the driving member, one pair in each slot, the connectors of each pair having interengaging coaxial pivotal parts entering the slot for the pair of connectors and each connector of a pair having a part mounted for sliding movement in a groove in the adjacent driven member, each groove receiving at least one of said parts and each pair of connectors lying in line with aligned intersections of grooves in the two driven members having parts mounted for sliding movement in non-registering grooves in the respective members.

7. In a differential, the combination of a pair of driven members mounted for coaxial rotation, each member having a central socket and a plurality of intersecting grooves in its face opposed to the other member, the grooves all having the same radius and the centers of curvature of all the grooves being equally spaced from and equiangularly spaced about the common axis of rotation of the members, a driving member between the driven members, the driving member having projections from its opposite sides received in the sockets in the driven members and supporting the driving member for rotation coaxial with the driven members, the driving member having a plurality of angularly spaced radial slots, the number of slots being at least equal to the number of grooves in a driven member, and a plurality of pairs of connectors mounted for sliding movement in the slots in the driving member, one pair in each slot, the connectors of each pair having interengaging coaxial pivotal parts entering the slot for the pair of connectors and each connector of a pair having a part mounted for sliding movement in a groove in the adjacent driven member, each groove receiving at least one of said parts and each pair of connectors lying in line with aligned intersections of grooves in the two driven members having parts mounted for sliding movement in non-registering grooves in the respective members.

8. In a differential, the combination of a pair of driven members mounted for coaxial rotation, each member having a plurality of intersecting circular grooves in its face opposed to the other member, the grooves all having the same radius and the centers of curvature of all the grooves being equally spaced from and equiangularly spaced about the common axis of rotation of the members, a driving member mounted for rotation coaxially with and between the driven members and having a plurality of angularly spaced radial slots extending through it, the number of slots being at least equal to the number of grooves in a driven member, means attached to the driving member for rotating it, and a plurality of pairs of connectors mounted for sliding movement in the slots in the driving member, one pair in each slot, the connectors of each pair having interengaging coaxial pivotal parts entering the slot for the pair of connectors and each connector of a pair having a part mounted for sliding movement in a groove in the adjacent driven member, each groove receiving at least one of said parts and each pair of connectors lying in line with aligned intersections of grooves in the two driven members having parts mounted for sliding movement in non-registering grooves in the respective members.

9. In a differential, the combination of a pair of driven members mounted for coaxial rotation, each member having a plurality of intersecting circular grooves in its face opposed to the other member, the grooves all having the same radius and the centers of curvature of all the grooves being equally spaced from and equiangularly spaced about the common axis of rotation of the members, a driving member mounted for rotation coaxially with and between the driven members and having a plurality of angularly spaced radial slots extending through it, the number of slots being at least equal to the number of grooves in a driven member, and a plurality of connectors disposed in pairs, each connector having a base of circular outline and of a diameter approximating the width of a slot in the driving member and a projection on one face receivable in a groove in a driven member, the bases of a pair of connectors having interengaging pivotal coaxial parts enabling the connectors to rock relatively to each other and the pairs of connectors having their bases mounted for sliding movement in the slots in the driving member, one pair of connectors per slot, and their projections having sliding engagement in a groove in the adjacent driven member, each groove receiving at least one of said projections and each pair of connectors lying in line with aligned intersections of grooves in the two driven members having projections sliding in non-registering grooves in the respective members.

References Cited in the file of this patent

UNITED STATES PATENTS

| Number | Name | Date |
|---|---|---|
| 1,505,570 | Levin | Aug. 19, 1924 |
| 1,934,721 | Lawler | Nov. 14, 1933 |
| 2,624,213 | Schott | June 6, 1953 |

FOREIGN PATENTS

| Number | Country | Date |
|---|---|---|
| 184,916 | Great Britain | Aug. 31, 1922 |
| 391,583 | Germany | Oct. 3, 1924 |
| 801,421 | Germany | Jan. 8, 1951 |
| 26,023 | Sweden | Dec. 12, 1908 |